Patented Mar. 6, 1923.

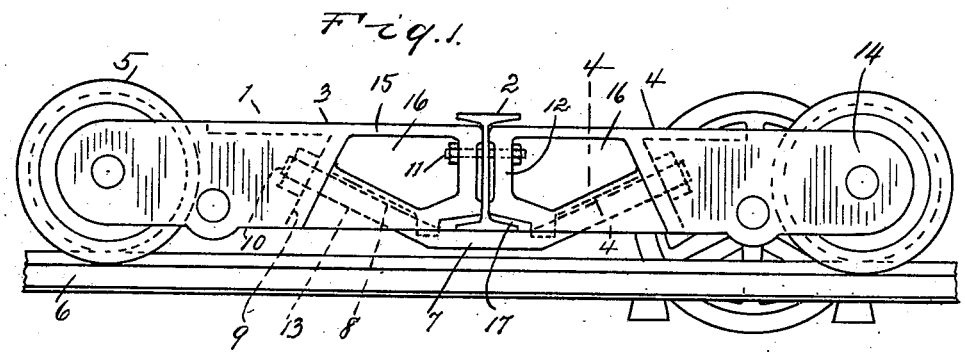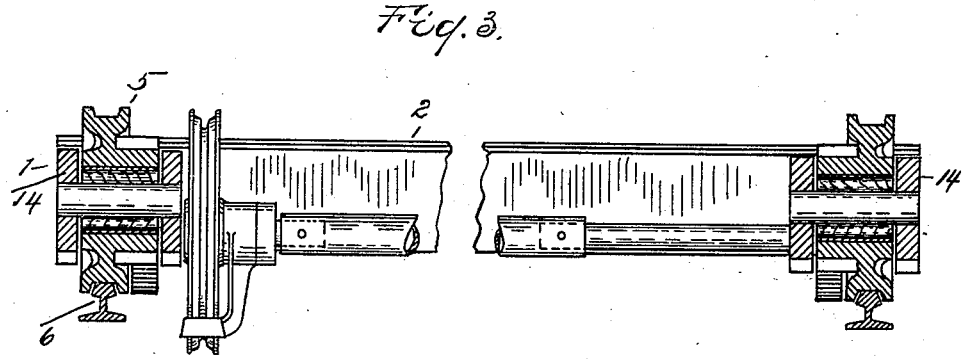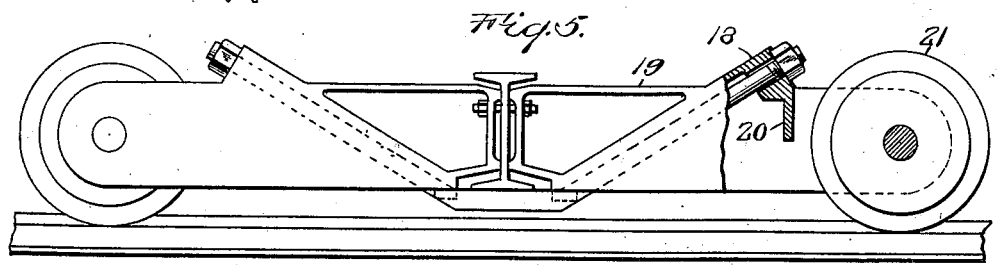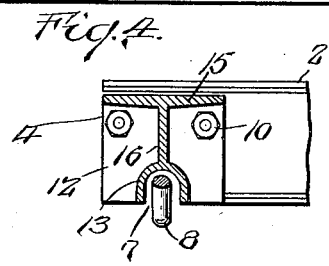

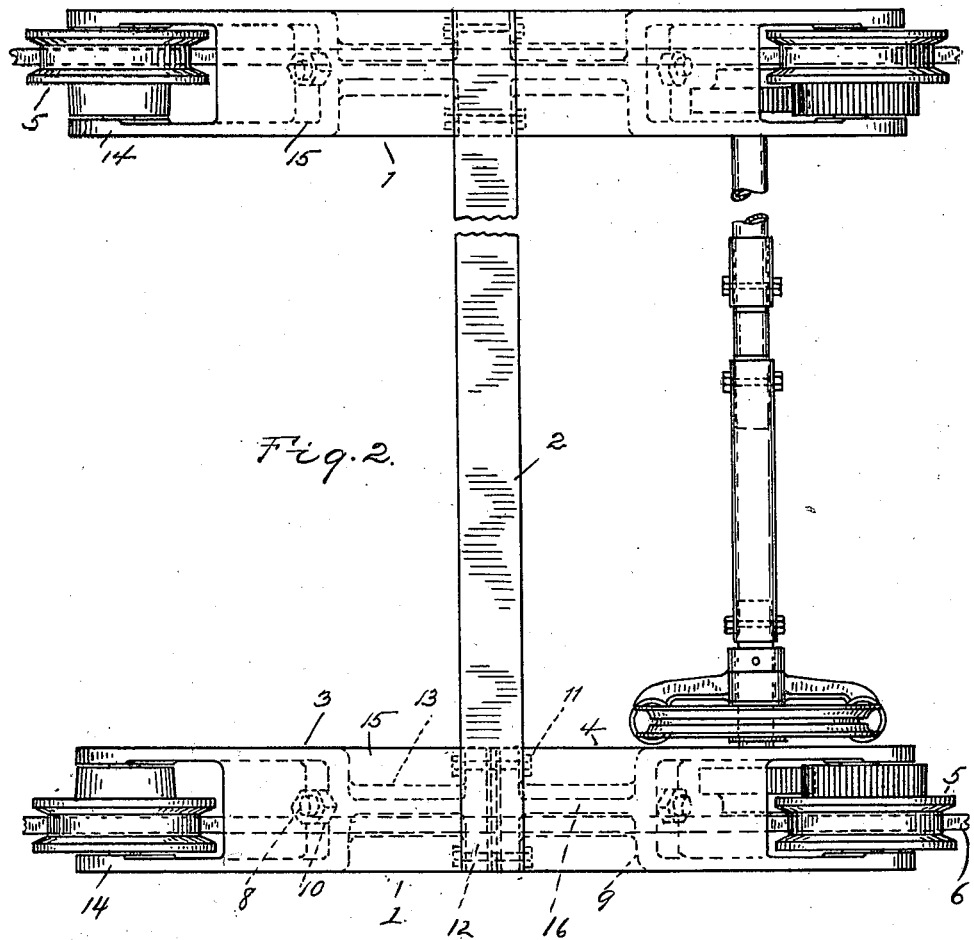

1,447,168

UNITED STATES PATENT OFFICE.

WILLIAM EDWARD BEE AND WILLIAM E. SIMPSON, OF DETROIT, MICHIGAN, ASSIGNORS TO PALMER-BEE COMPANY, OF DETROIT, MICHIGAN, A CORPORATION OF MICHIGAN.

CRANE.

Application filed December 29, 1920. Serial No. 433,839.

*To all whom it may concern:*

Be it known that we, WILLIAM E. BEE and WILLIAM E. SIMPSON, a citizen of the United States of America, and a subject of the King of Great Britain and Ireland, respectively, residing at Detroit, in the county of Wayne and State of Michigan, have invented certain new and useful Improvements in Cranes, of which the following is a specification, reference being had therein to the accompanying drawings.

The invention relates to cranes and refers more particularly to the carriages therefor. One object of the invention is to provide a crane carriage in which the side frames are each formed of a pair of frame members arranged end to end and clamps the trolley track therebetween; and also in which common means is provided for securing the frame members of each side frame to each other and for re-inforcing the same. Another object resides in so forming the frame members that the truss rod for securing the same to each other may be readily applied. Further objects of the invention reside in the combinations and arrangements of parts as more fully hereinafter set forth.

In the drawings:

Figure 1 is a side elevation of a construction embodying our invention;

Figure 2 is a top plan view thereof;

Figure 3 is an end view thereof partly in section;

Figure 4 is a cross section on the line 4—4 of Figure 1;

Figure 5 is a side elevation, partly in section, of a modified construction.

1 are the side frames of the crane carriage and 2 is the cross connection therebetween. This cross connection is the trolley track and is preferably an I-beam upon the lower flanges of which the trolley is supported. Each side frame comprises the frame members 3 and 4 arranged end to end and abutting the trolley track 2. 5 are wheels near the outer ends of the frame members 3 and 4 and engageable with the tracks 6.

For the purpose of securing the frame members 3 and 4 to each other and clamping the trolley track therebetween and at the same time re-inforcing the frame members, the truss rod 7 is provided extending beneath the inner ends of the frame members and having the upwardly inclined portions 8 extending within the frame members and passing through the abutments 9. Nuts 10 threadedly engaging the outer ends of the rod engage the abutments to clamp the frame members together. To position the inner ends of the frame members and also the trolley track therebetween, bolts 11 extend through the transverse flanges 12 at the inner ends of the frame members and through the web of the trolley track.

To permit of more readily assembling the truss rod with the frame members, each frame member has the downwardly opening tunnel portion 13 extending from near the inner end of the frame member to the abutment 9. The top of this tunnel portion inclines upwardly, and the abutment, as shown in Figure 1, is formed of a cross wall. The truss rod, in assembling, is moved upwardly into the tunnel portions and then its ends are passed through the cross walls by moving the frame members toward each other, after which the nuts are threaded upon the ends of the rod. The outer end portion of each frame member is bifurcated as at 14 for embracing the wheel 5.

To strengthen the frame members, they have the transversely extending flanges 15 at their upper edges and the web 16 connecting these flanges with the top of the tunnel portion 13 as well as the inner end flanges 12. Furthermore, the upper flanges are continued to extend between the furcations 14 to a point near the wheel.

The frame members 3 and 4 of the side frames are adapted to engage and clamp different sizes of trolley track therebetween, depending upon the load to be carried. As shown, these side frames have the recesses 17 in their inner lower edges which are of a size to receive the lower flanges of the different trolley tracks, while the height or depth of the side members at their inner ends is such that the upper flanges of the different trolley tracks extend above the same.

The trolley shown in Figure 5 differs from that shown in the other views in having the apertured abutment 18 formed by a projection in the upper face of each of the frame members 19. For re-inforcing the sides of the tunnel portion of each frame member, a suitable cross wall 20 is provided which is adjacent to the wheel 21 at the outer end of the frame member.

What we claim as our invention is:

1. In a crane carriage, the combination with a pair of frame members arranged end to end, of means near the outer ends of said frame members for supporting the same, and a common means for securing said frame members to each other and for reinforcing the same.

2. In a crane carriage, the combination with a pair of frame members arranged end to end, of wheels near the outer ends of said frame members for supporting the same, and a truss rod for securing said frame members to each other.

3. In a crane carriage, the combination with a pair of frame members arranged end to end and provided with downwardly-opening tunnel portions, of a truss rod passing beneath the inner ends of said frame members and having upwardly-extending portions within said tunnel portions, and means for securing the ends of said rod to said frame members.

4. In a crane carriage, the combination with a pair of frame members arranged end to end and provided with flanged inner ends and bifurcated outer ends and intermediate downwardly opening tunnel portions, of a truss rod passing beneath said flanged inner ends and having upwardly-inclined portions extending through said tunnel portions, and means for securing the ends of said rod to said frame members.

5. In a crane carriage, the combination with a pair of frame members arranged end to end and provided with downwardly opening tunnel portions, and apertured abutments near the outer ends of said tunnel portions and above the tops of said frame members, of a truss rod passing beneath the inner ends of said frame members and having upwardly inclined portions extending through said tunnel portions and apertured abutments, and nuts threadedly engaging the ends of said rod beyond said abutments.

6. In a crane carriage, the combination with a pair of side frames each comprising a pair of frame members arranged end to end, of a cross connection between said frames extending between the inner ends of said frame members, means for positioning the inner ends of said frame members and said cross connection, and a common means for securing said frame members to each other and for reinforcing the same.

7. In a crane carriage, the combination with a pair of frame members arranged end to end, and a transversely extending member between the adjacent ends of said frame members, of a truss rod passing beneath the inner ends of said frame members and engaging said transversely extending member and having upwardly extending portions secured to said frame members.

8. In a crane carriage, the combination with a pair of frame members arranged end to end, of a truss rod for securing said frame members to each other and having its ends secured to said frame members above their neutral axes and its intermediate portion engaging said frame members below their neutral axes.

In testimony whereof we affix our signatures.

WILLIAM EDWARD BEE.
WILLIAM E. SIMPSON.